United States Patent
Pauli et al.

(10) Patent No.: US 7,181,177 B2
(45) Date of Patent: Feb. 20, 2007

(54) CHANNEL ESTIMATION IN A MULTI CARRIER TRANSMIT DIVERSITY SYSTEM

(75) Inventors: Mathias Pauli, Nürnberg (DE); Eric Sachse, Dresden (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 561 days.

(21) Appl. No.: 10/766,023

(22) Filed: Jan. 29, 2004

(65) Prior Publication Data
US 2004/0185801 A1 Sep. 23, 2004

Related U.S. Application Data

(63) Continuation of application No. PCT/EP02/06403, filed on Jun. 11, 2002.

(30) Foreign Application Priority Data
Jul. 30, 2001 (EP) .................. 01118286

(51) Int. Cl.
H04B 1/02 (2006.01)
H04B 17/00 (2006.01)
H04B 1/04 (2006.01)
H04B 1/10 (2006.01)

(52) U.S. Cl. ................ 455/101; 455/67.13; 455/114.2; 455/296; 375/347

(58) Field of Classification Search ................ 455/101, 455/115.1, 130, 63.1, 66.1, 67.11, 67.13, 455/114.2, 226.1, 269, 277.2, 296; 375/346, 375/347, 349–350
See application file for complete search history.

(56) References Cited

U.S. PATENT DOCUMENTS

| | | | | |
|---|---|---|---|---|
| 5,822,380 A | | 10/1998 | Bottomley | |
| 5,943,606 A | * | 8/1999 | Kremm et al. | 455/12.1 |
| 6,028,900 A | * | 2/2000 | Taura et al. | 375/344 |
| 6,088,408 A | | 7/2000 | Calderbank et al. | |
| 6,108,517 A | * | 8/2000 | Arslan et al. | 455/21 |
| 6,256,486 B1 | * | 7/2001 | Barany et al. | 455/296 |
| 6,597,750 B1 | * | 7/2003 | Knutson et al. | 375/347 |

FOREIGN PATENT DOCUMENTS

FR 2 798 542 A 3/2001

OTHER PUBLICATIONS

Li et al; "Transmitter Diversity for OFDM Systems"; IEEE, Journal on Selec. Areas, vol. 17, No. 7, Jul. 1999, pp. 1233-1243.
Mudulodu et al; "A Transmit Diversity Scheme"; Proc. Globecom, San Francisco, Nov. 2000, pp. 1089-1093.
ETSI TR 101 683, Broadband Radio Access Networks (BRAN), System Overview, V1.1.1, Feb. 2000.
ETSI TS 101 475, Broadband Radio Access Networks (BRAN), Hiperlan Type 2, Physical (PHY) Layer, V1.1.1, Apr. 2000.
International Search Report mailed Dec. 10, 2002 in corresponding PCT Application No. PCT/EP02/06403.
International Preliminary Examination Report mailed Nov. 12, 2003 in corresponding PCT Application No. PCT/EP02/06403.

* cited by examiner

Primary Examiner—Tony T. Nguyen
(74) Attorney, Agent, or Firm—Nixon & Vanderhye, P.C.

(57) ABSTRACT

A method and a circuit (44) for estimating channel coefficients in a multi carrier transmit diversity system operating in accordance with a block-coding scheme is described. The method comprises determining from a receive signal (Y) for each channel estimated channel coefficients ($\hat{h}$) comprising interference components from adjacent channels artificially introduced during the estimation, deriving estimates for interference components and determining interference-compensated estimates ($\hat{H}_{F+IC}$) for the channel coefficients on the basis of the estimates for the interference components.

17 Claims, 6 Drawing Sheets

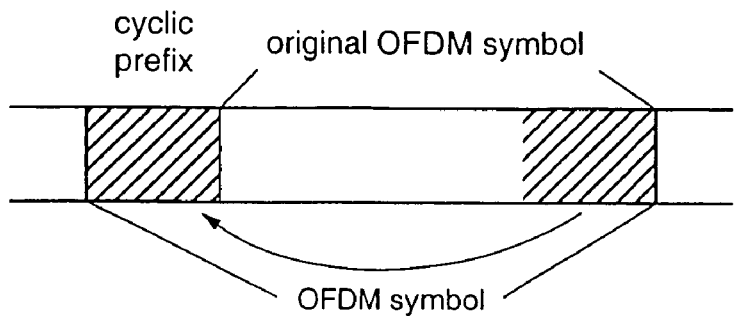
Fig. 2
| modulation scheme | code rate | bit rate |
|---|---|---|
| BPSK | 1/2 | 6 Mbps |
| BPSK | 3/4 | 9 Mbps |
| QPSK | 1/2 | 12 Mbps |
| QPSK | 3/4 | 18 Mbps |
| 16-QAM | 9/16 | 27 Mbps |
| 16-QAM | 3/4 | 36 Mbps |
| 64-QAM | 3/4 | 54 Mbps |
Fig. 4
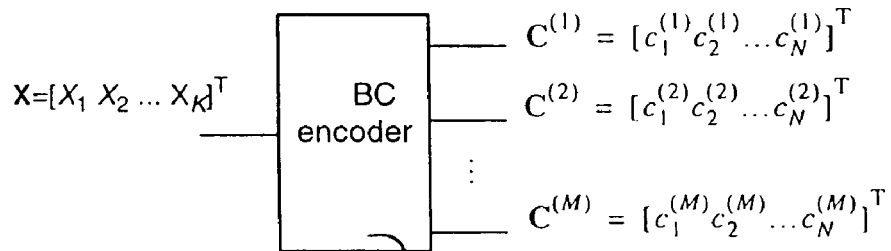
Fig. 5
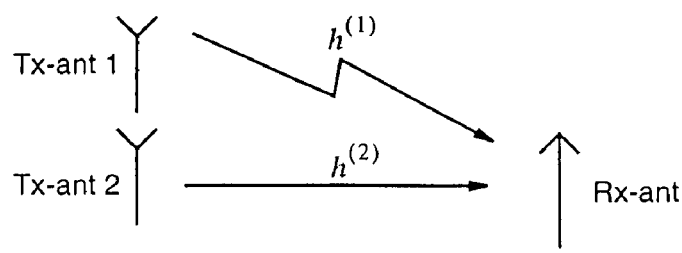
Fig. 6

CHANNEL ESTIMATION IN A MULTI CARRIER TRANSMIT DIVERSITY SYSTEM

This application is a continuation of PCT International application No. PCT/EP02/06403 filed 11 Jun. 2002. PCT/EP02/06403 claims priority to EP Application No. 01118286.2 filed 30 Jul. 2001. The entire contents of these applications are incorporated herein by reference.

BACKGROUND OF THE INVENTION

1. Technical Field

The present invention relates to the field of transmit antenna diversity and in particular to a method of estimating channel coefficients in a multi carrier transmit diversity system. The invention also relates to an estimating circuit for performing channel estimation operations and to a transceiver of a wireless communication system comprising such an estimating circuit.

2. Discussion of the Prior Art

Peak transmission rates in wireless communication systems have steadily increased during the last years. However, peak transmission rates are still limited for example due to path loss, limited spectrum availability and fading.

Transmitter diversity is a highly effective technique for combating fading in wireless communications systems. Several different transmit diversity schemes have been proposed. In Li, Y.; Chuang, J. C.; Sollenberger, N. R.: Transmitter diversity for OFDM systems and its impact on high-rate data wireless networks, IEEE Journal on Selec. Areas, Vol. 17, No. 7, July 1999 the transmit diversity schemes of delay, permutation and space-time coding are exemplarily described. According to the delay approach, a signal is transmitted from a first transmitter antenna and signals transmitted from further transmitter antennas are delayed versions of the signal transmitted from the first transmitter antenna. In the permutation scheme, the modulated signal is transmitted from a first transmitter antenna and permutations of the modulated signal are transmitted from further transmitter antennas. Thus, the signal transmitted from the transmitter antennas can be derived from a matrix composed of data words in the form of the modulated signal and of permutations of the modulated signal. By means of space-time coding a signal is encoded into several data words and each data word is transmitted from a different transmitter antenna. During transmission the data words are spread (i.e., multiplexed) in the time domain by successively transmitting the data symbols of each data word over a single carrier frequency.

A further transmit diversity scheme for a multicarrier system is space-frequency coding. By means of space-frequency coding a signal is encoded into several data words and each data word is spread (i.e., multiplexed) in the frequency domain by transmitting the data symbols of each data word on orthogonal frequencies, i.e. orthogonal subcarriers. An exemplary scheme for space-frequency coding is described in Mudulodu, S.; Paulraj, A.: A transmit diversity scheme for frequency selective fading channels, Proc. Globecom, San Francisco, pp. 1089–1093, November 2000. According to the multicarrier system described in this paper, the data words relating to an encoded signal are preferably multiplexed in the time domain although orthogonal frequencies are available and the data words could thus also be multiplexed in the frequency domain. This is due to the fact that if multiplexing in the frequency domain was utilized the employed frequencies, i.e. subcarriers, had to see the same channel, which may not always be possible in a frequency selective fading channel. However, in case the subcarriers experience the same channel, it is stated that either multiplexing in the time domain or multiplexing in the frequency domain or a combination of the two may be used. By combining multiplexing in the time domain and in the frequency domain the data symbols of a data word are simultaneously multiplexed in the time domain and in the frequency domain. This means that the data word is spread both across time and across frequencies.

Another transmit diversity scheme is described in U.S. Pat. No. 6,088,408. According to this transmit diversity scheme data are coded and transmitted as individual data blocks. Each data block comprises several data words and each data word contains data symbols derived from an input data signal. During transmission of the data blocks, the individual data words are spread in the time domain. Therefore, the transmit diversity scheme described in U.S. Pat. No. 6,088,408 can be referred to as space-time block-coding (STBC). The main features of STBC are that each data symbol is transmitted from each transmit antenna and that the antenna signals of different transmit antennas are orthogonal to each other. Orthogonal STBC data blocks can be designed for an arbitrary number of transmit antennas.

An important feature on a receiving side of a multi carrier transmit diversity system is a characterization of the individual transmit channels. Consequently, a channel estimation has to be performed as described in Li, Y.; Chuang, J. C.; Sollenberger, N. R.: Transmitter diversity for OFDM systems and its impact on high-rate data wireless networks, IEEE Journal on Selec. Areas, Vol. 17, No. 7, July 1999 and in U.S. Pat. No. 6,088,408.

Departing from the various channel estimation approaches known in the art there is a need for a more accurate method of estimating channel coefficients in a multi carrier transmit diversity system operating in accordance with a block-coding scheme. There is also a need for an estimating circuit for performing the corresponding estimating method and for a transceiver comprising such an estimating circuit.

BRIEF DESCRIPTION OF THE INVENTION

The existing need is satisfied by a method of estimating channel coefficients in a multi carrier transmit diversity system operating in accordance with a block-coding scheme, comprising determining from a receive signal for each channel individually estimated channel coefficients comprising artificially introduced interference components from adjacent channels, deriving estimates for the interference components and determining interference-compensated estimates for the channel coefficients utilizing the estimates for the interference components.

The channel estimation method of the invention is not restricted to a specific block-coding scheme as long as the utilized block-coding scheme enables to generate from a data signal block code matrices, preferably in the form of data blocks comprising data words, wherein each data word contains data symbols derived from the data signal. For example, the transmit diversity schemes of space-time block-coding, of space-frequency block-coding (SFBC) and of permutation in the time domain or in the frequency domain allow to generate such data blocks. Preferably, the generated data blocks have the structure of a matrix similar to an STBC or SFBC code matrix.

The channel estimation method according to the invention does not require that the transmit diversity scheme guarantees full transmit diversity and orthogonality. For example, the invention does not necessitate that each information symbol comprised within the data signal is transmitted from each transmitter antenna. Nonetheless, a preferred embodiment of the invention comprises the feature of full transmit diversity and orthogonality.

Moreover, the invention is not restricted to any number of transmit and receive antennas. Preferably, the number of data words per data block equals the number of transmit antennas such that each data word of a data block may be transmitted from an individual transmitter antenna. If more than one receive antenna is provided, the receive diversity scheme of maximum-ratio combining can be applied. However, other receive diversity schemes may be used as well.

Various alternatives for determining an estimate for the channel coefficients exist. For example, the determination of the estimated channel coefficients can be based on the assumption that the channels do not change during a specific amount of instants required to transmit two or more data symbols or a complete data word comprising N data symbols. In the present case, the expression instants denotes either specific moments in time or specific frequencies, depending on whether the data words are spread in time direction or in frequency direction. This means that if the data words are spread in time direction, the specific amount of instants corresponds to a specific time interval. On the other hand, if the data words are spread in the frequency direction, the specific amount of instants corresponds to a specific frequency band.

The above assumption or other assumptions regarding the channel coefficients may have the consequence that the channel coefficients estimated for two or more adjacent instants are identical. Thus, in a graphical representation the estimated channel coefficients for a specific channel will change in a stepwise manner in the time or frequency direction (FIG. 11). The width of the steps corresponds to the amount of instants during which it is assumed that the channels do not change. If, for example, it is assumed that the channels do not change during N instants required to transmit a data word comprising N data symbols, the steps in a graphical representation of the estimated channel coefficients will have a width of N instants.

The estimated channel coefficients can be derived from the product of a known data block comprised within the receive signal and the Hermitian of this known data block. The known data block comprised within the receive signal may be a standardized signal portion like a preamble of the data signal to be transmitted. The standardized signal portion preferably has a data content which is known on the receive side.

Based on the estimated channel coefficients, estimates for the interference components have to be provided. To this end, in a first step two or more estimated channel coefficients of a specific channel may be processed exploiting a correlation among the two or more estimated channel coefficients. By means of this processing an interference of the individual channels can be simulated. Therefore, in a second step, estimates for the interference components, which are comprised within the estimated channel coefficients and which were artificially introduced, e.g. during the estimation step, can be derived from the processed channel coefficients. Usually, step-like structures within the estimated channel coefficients of a specific channel are broken as a result of the processing.

Processing the estimated channel coefficients by utilizing their correlation can be performed in various ways. It is preferably conducted such that the correlation among a plurality of estimated channel coefficients belonging to different instants is exploited. As an example, the estimated channel coefficients may undergo an interpolation or a filtering step. The interpolation may be effected by linear interpolation. Filtering has the additional advantage that it not only exploits the correlation among the estimated channel coefficients of a specific channel, but also brings about an efficient noise suppression.

Preferably, the processed channel coefficients are not only used for deriving estimates for the interference components, but also as a basis for determining improved estimates for the channel coefficients by taking into account the estimated interference components. For example, determining the improved estimates may comprise subtracting the estimated interference components from the processed channel coefficients. Thus, interference cancellation is effected.

The above method can be implemented both as a computer program product comprising program code portions for performing the method and as a hardware solution. The hardware solution is constituted by an appropriately configured estimating circuit for estimating channel coefficients in a multi carrier transmit diversity system operating in accordance with a block-coding scheme. The estimating circuit comprises a unit for determining from a receive signal for each channel estimated channel coefficients comprising artificially introduced interference components from adjacent channels, and a unit for deriving estimates for the interference components and for determining interference-compensated estimates for the channel coefficients utilizing the estimates for the interference components. Preferably, the estimating circuit further comprises a processing unit for processing two or more of the estimated channel coefficients such that a correlation among the estimated channel coefficients is exploited.

According to a preferred embodiment, it is determined for one or more of the data blocks in dependence on at least one transmission constraint if the data words of said one or more data blocks are to be multiplexed in the time domain or in the frequency domain. The data words of the data blocks may thereafter be multiplexed in accordance with the result of the determination. It may thus be decided on a data block level how the data words are to be multiplexed. The decision on the data block level allows to change the multiplexing domain from one data block to a subsequent data block which is advantageous if one has to cope with specific predefined or varying transmission constraints. Such a multiplexing method can be applied in various wireless communication systems without major changes due to the specific multiplexing flexibility gained by selecting the multiplexing domain on the data block level. The multiplexing domain can be determined for each data block individually or simultaneously for a plurality of data blocks. For example, it can be decided for a sequence of data blocks that all data words comprised within the sequence of data blocks are to be multiplexed in either the time domain or in the frequency domain.

The multiplexing domain is preferably determined by taking into account one or more transmission constraints. For example, the transmission constraints may comprise one or more physical transmission constraints or one or more data-related transmission constraints. The transmission constraints can also comprise both one or more physical transmission constraints as well as one or more data-related transmission constraints. The physical transmission constraints relate to the physical transmission conditions and can be derived from physical transmission parameters like a channel coherence bandwidth or a coherence time. The data-related transmission constraints relate to system specific constraints regarding for example the employed multiplexing scheme for the data words, a given structure of the data signal, a given structure of the data blocks, a given structure of the data words or a given structure of the data symbols.

The physical transmission constraints may be determined based on at least one of a channel coherence bandwidth $$B_C \approx 1/\tau_{rms} \quad (1)$$

and a coherence time $$t_C \approx 1/(2 \cdot f_D), \quad (2)$$

wherein $f_D$ is the doppler frequency and $\tau_{rms}$ is the root mean square of the delay spread of the channel impulse response.

Many transmit diversity schemes require constant or at least approximately constant channel parameters during transmission of one data word. If the data words are to be multiplexed in the frequency domain, a comparatively large coherence band width is required. This means that the relation $$B_C \gg N/T \quad (3)$$

has to be fulfilled at least approximately, wherein N is the number of data symbols per data word and T is the duration of one of the data symbols, i.e. the duration of one time slot. A comparatively large coherence bandwidth requires that the channel coefficients of N adjacent subcarriers have to be almost constant.

On the other hand, if the data words are to be multiplexed in the time domain, a comparatively large coherence time is required. This means that the relation $$t_C \gg T \cdot N \quad (4)$$

has to be fulfilled at least approximately. In other words: N subsequent data symbols have to have nearly constant channel parameters, i.e. the channel coefficients for a single subcarrier have to remain constant for a period of N·T.

The physical transmission constraint may be determined by assessing if one or both of the relations (3) and (4) are fulfilled. Dependent on which of the two relations (3) and (4) is fulfilled best, it may be decided that the data words of the data blocks are to be multiplexed either in the time domain or in the frequency domain as a general rule. Deviations from this general rule may become necessary due to data-related transmission constraints.

The data symbols may be derived from the data signal in various ways dependent on the block-coding scheme which is used. If, for example, the block-coding scheme of permutation in the time or frequency domain is used, the data symbols contained in the data words are permutations of information symbols comprised within the data signal. As a further example, if the block-coding scheme of space-time or space-frequency block-coding is used, the data symbols contained in the data words are obtained from the information symbols comprised within the data signal by means of permutation and basic arithmetic operations, such as negation and complex conjugation.

The data signal from which the one or more data blocks are generated can have any format. According to a preferred embodiment, the data signal has the format of a sequence of discrete information symbols. For example, the data signal may have the structure of vectors, each vector comprising a predefined number of information symbols. The nature of the information symbols may depend on the specific wireless communication system in which the method according to the invention is used. Many wireless communication systems employ different types of information symbols for different purposes. For example, some wireless communication systems use data signals which comprise a preamble, one or more user data sections or both a preamble and one or more user data sections. Usually, the preamble has a predefined structure and enhances functions like channel estimation, frequency synchronization and timing synchronization.

BRIEF DESCRIPTION OF THE DRAWINGS

Further advantages of the invention will become apparent by reference to the following description of preferred embodiments of the invention in the light of the accompanying drawings, in which:

FIG. 2 shows the structure of an OFDM symbol comprising a cyclic prefix;

FIG. 4 shows several modulation schemes defined in the HIPERLAN/2 standard;

FIG. 5 shows a block code encoder of the transceiver depicted in FIG. 3;

FIG. 6 shows a configuration of a transmit antenna diversity scheme;

DESCRIPTION OF PREFERRED EMBODIMENTS

Although the present invention can be used in any multi carrier transmit diversity system which employs a transmit diversity scheme allowing to generate data blocks having a structure similar to e.g. a STBC code matrix, the following description of preferred embodiments is exemplarily set forth with respect to a multi carrier system which employs orthogonal frequency division multiplexing (OFDM) and which alternately utilizes STBC and SFBC for generating data blocks from a data signal.

The exemplary multi carrier system is derived from the European wireless local area network (WLAN) standard HIgh PErformance Radio Local Area Network type 2 (HIPERLAN/2). HIPERLAN/2 systems are intended to be operated in the 5 GHz frequency band. Up to now, the HIPERLAN/2 system and many other wireless communications systems do not support transmit diversity in spite of the fact that transmit diversity would improve the transmission performance and reduce negative effects of fast fading like Rayleigh fading. A system overview of HIPERLAN/2 is given in ETSI TR 101 683, Broadband Radio Access Networks (BRAN); HIPERLAN Type 2; System Overview, V1.1.1 (2000–02) and the physical layer of HIPERLAN/2 is described in ETSI TS 101 475; Broadband Radio Access networks (BRAN); HIPERLAN Type 2; Physical (PHY) Layer, V1.1.1 (2000–04). The multi carrier scheme of OFDM, which is specified in the HIPERLAN/2 standard, is very robust in frequency selective environments.

Figure 1:
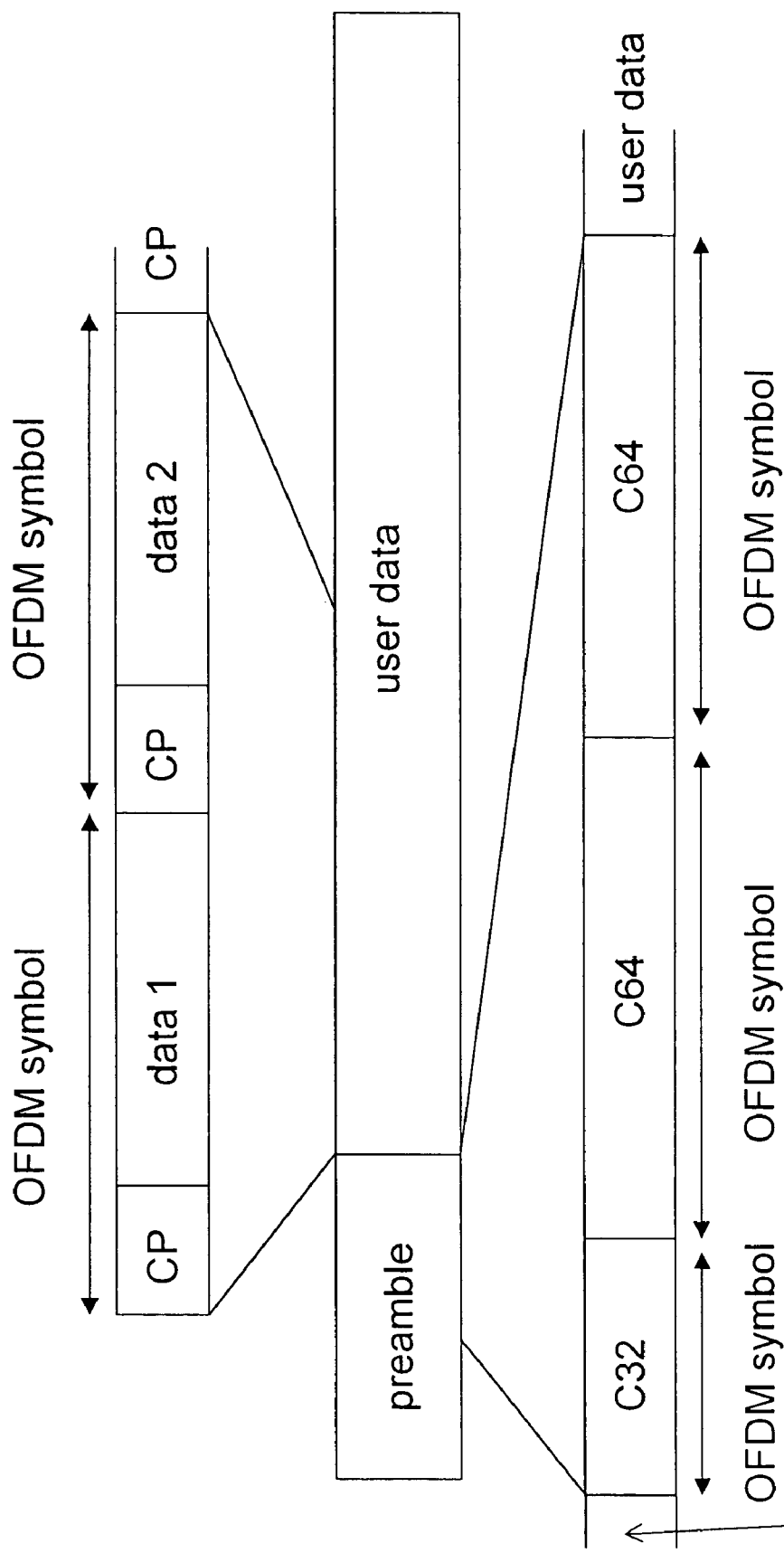
FIG. 1 shows a data signal in the form of a physical burst to be processed in accordance with the invention.

In FIG. 1 a typical physical burst of HIPERLAN/2 is illustrated. The physical burst comprises a preamble consisting of preamble symbols and a user data section consisting of user data symbols. In HIPERLAN/2 five different physical bursts are specified. Three of the five physical bursts have a different preamble each and the two remaining physical bursts have a further preamble in common. The last three preamble symbols constitute a periodic structure which is identical for all preamble types. This periodic structure consists of a short OFDM symbol C32 of 32 samples followed by two identical regular OFDM symbols C64 of 64 samples. The short OFDM symbol C32 is a cyclic prefix which is a repetition of the second half of one of the C64 OFDM symbols. The so-called C-preamble depicted in FIG. 1 is used in HIPERLAN/2 for channel estimation, frequency synchronization and timing synchronization. The periodic structure within the C-preamble is necessary in order to allow the use of synchronization algorithms with comparatively low complexity.

The user data section of the physical burst depicted in FIG. 1 comprises a variable number $N_{SYM}$ of OFDM symbols required to transmit a specific protocol data unit (PDU) train. Each OFDM symbol of the user data section consists of a cyclic prefix and a useful data part. The cyclic prefix consists of a cyclic continuation of the useful data part and is inserted before it. Thus, the cyclic prefix is a copy of the last samples of the useful data part as depicted in FIG. 2.

The length of the useful data part of the physical burst shown in FIG. 1 is equal to 64 samples and has a duration of 3.2 μs. The cyclic prefix has a length of either 16 (mandatory) or 8 (optional) samples and a duration of 0.8 μs or 0.4 μs, respectively. Altogether, a OFDM symbols has a length of either 80 or 72 samples corresponding to a symbol duration of 4.0 μs or 3.6 μs, respectively. An OFDM symbol therefore has an extension in the time domain. A OFDM symbol further has an extension in the frequency domain. According to HIPERLAN/2, a OFDM symbol extends over 52 subcarriers. 48 subcarriers are reserved for complex valued subcarrier modulation symbols and 4 subcarriers are reserved for pilots.

For typical HIPERLAN/2 scenarios the above relation (4) is usually fulfilled because the doppler frequency $f_D$ is comparatively low. However, especially in outdoor environments, relatively large delay spreads can occur. Consequently, relation (3) cannot always be fulfilled. Therefore, a transmit diversity scheme like STBC multiplexing in the time domain should generally be a preferred transmit diversity scheme for a HIPERLAN/2 scenario from the point of view that the channel over one space-time data word should be as constant as possible. However, the following and further problems may arise when STBC is applied to physical bursts having the structure depicted in FIG. 1 or a similar structure.

Both the physical burst and the OFDM symbols comprised therein have predefined dimensions in the time domain and in the frequency domain. Concurrently, STBC requires that each STBC data word has a predetermined length N. Thus, data unit fitting problems arise if the dimension of e.g. an OFDM symbol of the preamble or of the user data section cannot be mapped on an integer multiple of the length of one STBC data word. Moreover, when applying STBC to the periodic C-preamble depicted in FIG. 1, the periodicity of the C-preamble gets lost. This is due to the fact that the one or more STBC data words relating to the second C64 OFDM symbol will no longer be equal to the one or more STBC data words relating to the first C64 OFDM symbol. The loss of periodicity, however, leads to the problem that the symbol synchronization algorithms which make use of a periodic structure within the preamble can no longer be employed. Also, the C32 OFDM symbol cannot serve any longer as a guard interval separating the OFDM symbols within the preamble. The reason therefore is that in case of multipath propagation the first C64 OFDM symbol interferes with the second C64 OFDM symbol which is no longer equal to the first C64 OFDM symbol. The above problems and further problems not explicitly discussed above do not occur when the data words are multiplexed in the frequency domain. Therefore it is advantageous to dynamically switch between STBC and SFBC on a data block level during transmission.

Figure 3:
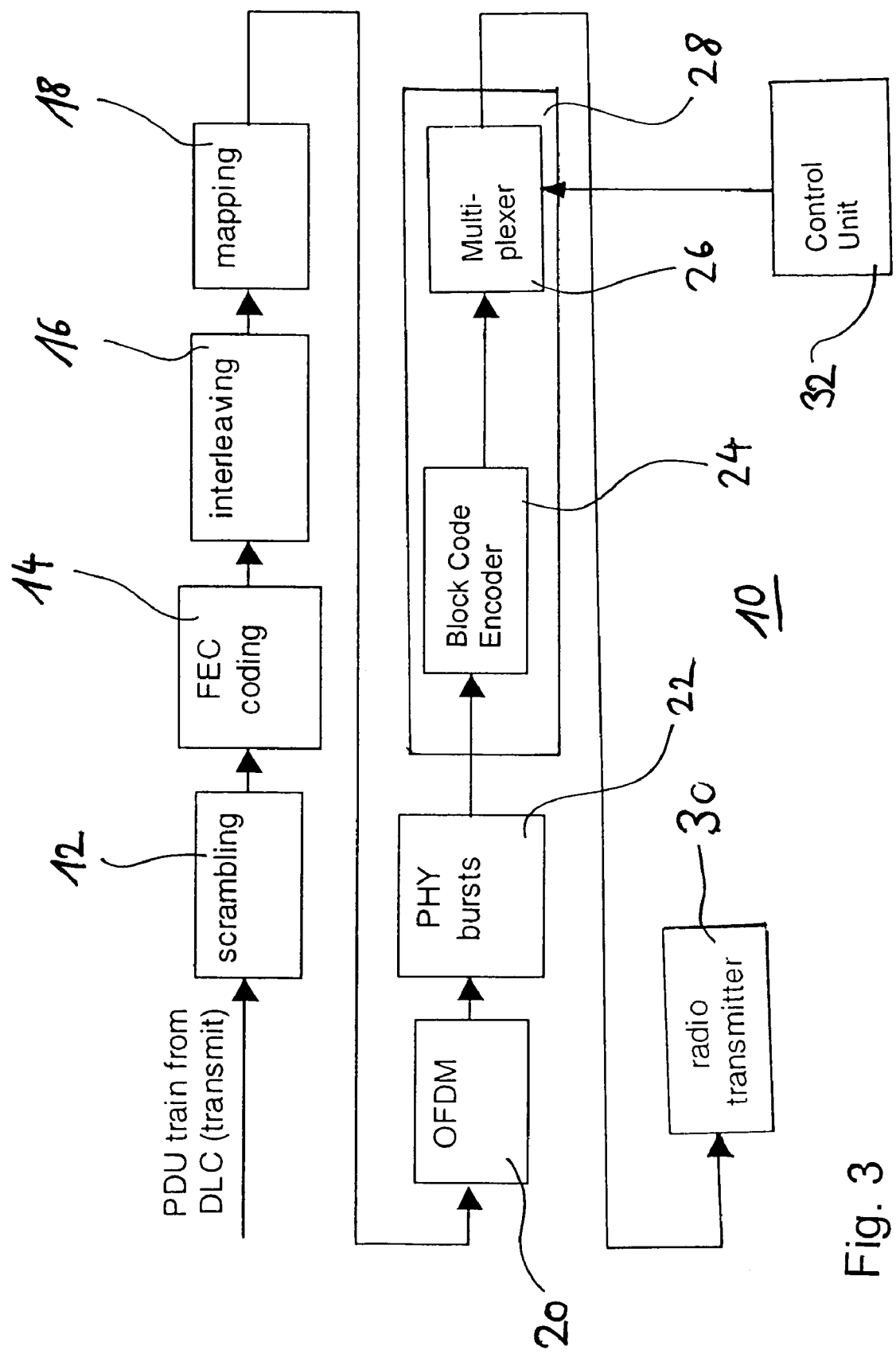
FIG. 3 is a block diagram of a transmitter stage of a transceiver for wireless communication.

In FIG. 3, the physical layer of a transmitter stage 10 of a transceiver is illustrated. The transmitter stage 10 comprises a scrambler 12, an FEC coding unit 14, an interleaving unit 16, a mapping unit 18, an OFDM unit 20, a burst forming unit 22, a block code encoder 24, a multiplexer 26, a radio transmitter 30 and a control unit 32. The block code encoder 24 and the multiplexer 26 together form an encoder/multiplexer unit 28.

The transmitter stage 10 depicted in FIG. 3 receives as input signal a PDU train from a data link control (DLC). Each PDU train consists of information bits which are to be framed into a physical burst, i.e. a sequence of OFDM symbols to be encoded, multiplexed and transmitted.

Upon receipt of a PDU train the transmission bit rate within the transceiver is configured by choosing an appropriate physical mode based on a link adaption mechanism. A physical mode is characterized by a specific modulation scheme and a specific code rate. In the HIPERLAN/2 standard several different coherent modulation schemes like BPSK, QPSK, 16-QAM and optional 64-QAM are specified. Also, for forward error control, convolutional codes with code rates of 1/2, 9/16 and 3/4 are specified which are obtained by puncturing of a convolutional mother code of rate 1/2. The possible resulting physical modes are depicted in FIG. 4. The data rate ranging from 6 to 54 Mbit/s can be varied by using various signal alphabets for modulating the OFDM subcarriers and by applying different puncturing patterns to a mother convolutional code.

Once an appropriate physical mode has been chosen, the $N_{BPDU}$ information bits contained within the PDU train are scrambled with the length-127 scrambler 12. The scrambled bits are then output to the FEC coding unit 14 which encodes the $N_{BPDU}$ scrambled PDU bits according to the previously set forward error correction.

The encoded bits output by the FEC coding unit 14 are input into the interleaving unit 16 which interleaves the encoded bits by using the appropriate interleaving scheme for the selected physical mode. The interleaved bits are input into the mapping unit 18 where sub-carrier modulation is performed by mapping the interleaved bits into modulation constellation points in accordance with the chosen physical mode. As mentioned above, the OFDM subcarriers are modulated by using BPSK, QPSK, 16-QAM or 64-QAM modulation depending on the physical mode selected for data transmission.

The mapping unit 18 outputs a stream of complex valued subcarrier modulation symbols which are divided in the OFDM unit in groups of 48 complex numbers. In the OFDM unit a complex base band signal is produced by OFDM modulation as described in ETSI TS 101 475, Broadband Radio Access Networks (BRAN); HIPERLAN Type 2; Physical (PHY) Layer, V1.1.1 (2000–04).

The complex base band OFDM symbols generated within the OFDM unit 20, where pilot subcarriers are inserted, are input into the physical burst unit 22, where an appropriate preamble is appended to the PDU train and the physical burst is built. The physical burst produced by the physical burst unit 22 has a format as depicted in FIG. 1. The physical burst unit 22 thus outputs a sequence of complex base band OFDM symbols in the form of the physical burst to the block code encoder 24.

The function of the block code encoder 24 is now generally described with reference to FIG. 5. In general, the block code encoder 24 receives an input signal in the form of a sequence of vectors $X=[X_1 X_2 \ldots X_K]^T$ of the length K. The block code encoder 24 encodes each vector X and outputs for each vector X a data block comprising a plurality of signal vectors $C^{(1)}, C^{(2)} \ldots, C^{(M)}$ as depicted in FIG. 5. Each signal vector $C^{(1)}, C^{(2)} \ldots, C^{(M)}$ corresponds to a single data word. Thus, the data block generated from the vector X comprises M data words, wherein M is the number of transmitter antennas.

Each data word $C^{(i)}$ with $i=1 \ldots M$ comprises N data symbols, i.e. each data word $C^{(i)}$ has a length of N. The value of N cannot be freely chosen since the matrix C spanned by the data words $C^{(i)}$ has to be orthogonal in this embodiment. Several examples for data blocks in the form of orthogonal code matrices C are described in U.S. Pat. No. 6,088,408 herewith incorporated by reference. In the block-coding approach described in the present embodiment, all data symbols $c_j^i$ of the code matrix C are derived from the components of the input vector X and are simple linear functions thereof or of its complex conjugate.

If a receive signal vector Y at one receive antenna is denoted by $Y=[Y_1 Y_2 \ldots Y_N]^T$, the relationship between Y and the code matrix C is as follows:

$$\begin{bmatrix} Y_1 \\ Y_2 \\ \ldots \\ Y_N \end{bmatrix} = \begin{bmatrix} c_1^{(1)} & c_1^{(2)} & \ldots & c_1^{(M)} \\ c_2^{(1)} & \ldots & & c_2^{(M)} \\ \ldots & \ldots & \ldots & \ldots \\ c_N^{(1)} & c_N^{(2)} & \ldots & c_N^{(M)} \end{bmatrix} \cdot \begin{bmatrix} h^{(1)} \\ h^{(2)} \\ \ldots \\ h^{(M)} \end{bmatrix} \quad (5)$$

where $h^{(i)}$ represents the channel coefficient of the channel from the i-th transmit antenna to the receive antenna. A generalization to more receive antennas is straightforward.

In the following, examples of possible block code matrices for two and three transmitter antennas, respectively, are discussed in more detail. The configuration of a wireless communication system with two transmit antennas and one receive antenna is depicted in FIG. 6. The wireless communications system of FIG. 6 comprises two transmit channels, each transmit channel being characterized by a specific channel coefficient $h^{(i)}$ with $i=1,2$.

For two transmit antennas one possible block code matrix C with a code rate R=1 is $$C = \begin{bmatrix} X_1 & X_2 \\ -X_2^* & X_2^* \end{bmatrix} \quad (6)$$

For three transmit antennas one possible block code matrix C with a code rate R=0,5 is:

$$C = \begin{bmatrix} X_1 & X_2 & X_3 \\ -X_2 & X_1 & -X_4 \\ -X_3 & X_4 & X_1 \\ -X_4 & -X_3 & X_2 \\ X_1^* & X_2^* & X_3^* \\ -X_2^* & X_1^* & -X_4^* \\ -X_3^* & X_4^* & X_1^* \\ -X_4^* & -X_3^* & X_2^* \end{bmatrix} \quad (7)$$

The code rate R is defined as the ratio of the length K of the input vector X and the length N of each code word $C^{(i)}$:

$$R = K/N \quad (8)$$

As can be seen from FIG. 5, the block code encoder 24 outputs for each data signal in the form of a vector X a data block in the form of a matrix C. The data block output by the block code encoder 24 is input into the multiplexer 26 which multiplexes the data words (vectors $C^{(i)}$) of each datablock in accordance with an externally provided control signal either in the time domain or in the frequency domain. The control signal is generated by the control unit 32 based on an assessment of the transmission constraints.

In the multi carrier scheme OFDM, the output of the block code encoder 24 is modulated onto subcarriers which are orthogonal to each other. There exist essentially two possibilities to multiplex a data block comprising individual data words in an OFDM system. According to a first possibility depicted in FIG. 7, the data words of a specific data block are extended in the time direction (STBC). In other words: The data words are multiplexed in the time domain. According to a second possibility, the data words of a data block are extended in the frequency direction as depicted in FIG. 8 (SFBC).

Figure 7:
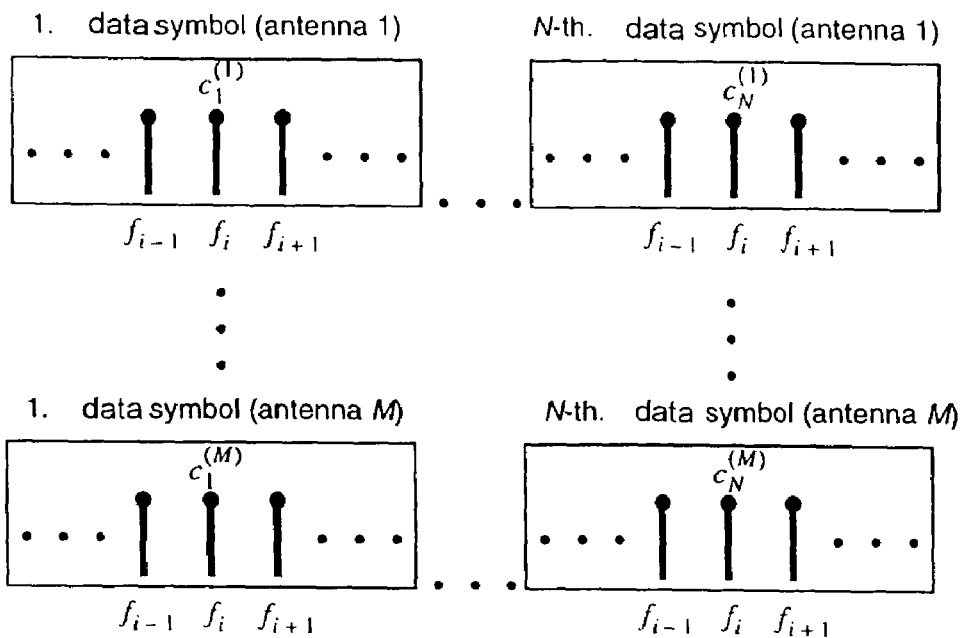
FIG. 7 is a schematic diagram of multiplexing data words in the time domain.
Figure 8:
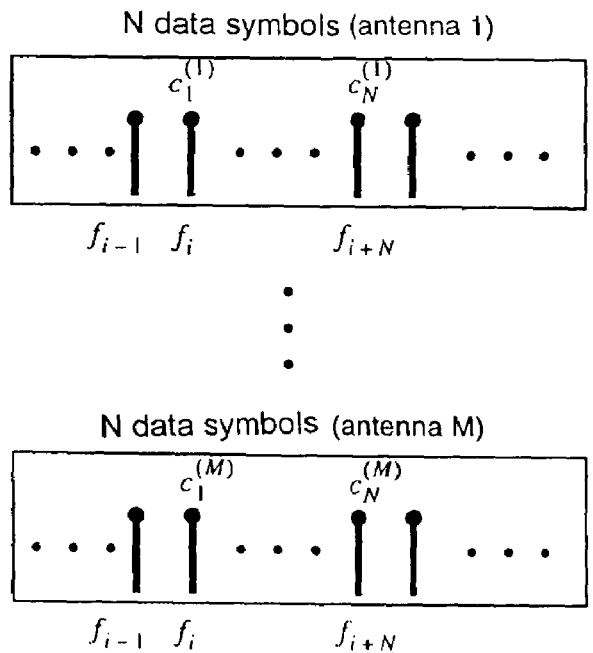
FIG. 8 is a schematic diagram of multiplexing data words in the frequency domain.

As can be seen from FIGS. 7 and 8, the individual data words of a data block are transmitted from different transmit antennas. According to the multiplexing scheme of FIG. 7, an individual data block is transmitted on an individual subcarrier over a time interval of N·T, wherein N is the number of data symbols per data word and T is the duration of one of the data symbols. According to the multiplexing scheme of FIG. 8, an individual data block is spread over N subcarriers and is transmitted during a time interval of T. It can clearly be seen that the multiplexing scheme of FIG. 7 can generally be employed when relation (4) is fulfilled, whereas the multiplexing scheme of FIG. 8 can generally be employed when relation (3) is satisfied.

The encoded and multiplexed output signal of the encoder/multiplexer unit 28 is input into the radio transmitter 30. The radio transmitter 30 performs radio transmission over a plurality of transmit antennas by modulating a radio frequency carrier with the output signal of the encoder/multiplexer unit 28.

The transceiver with the transmitter stage 10 of FIG. 3 further comprises a receiver stage not depicted in FIG. 3.

The receiver stage has a physical layer with components for performing the inverse operations of the components depicted in FIG. 3. For example, the receiver stage comprises a descrambler, a FEC decoding unit, a demultiplexer/decoder unit with a demultiplexer and a block code decoder, etc.

Figure 9:
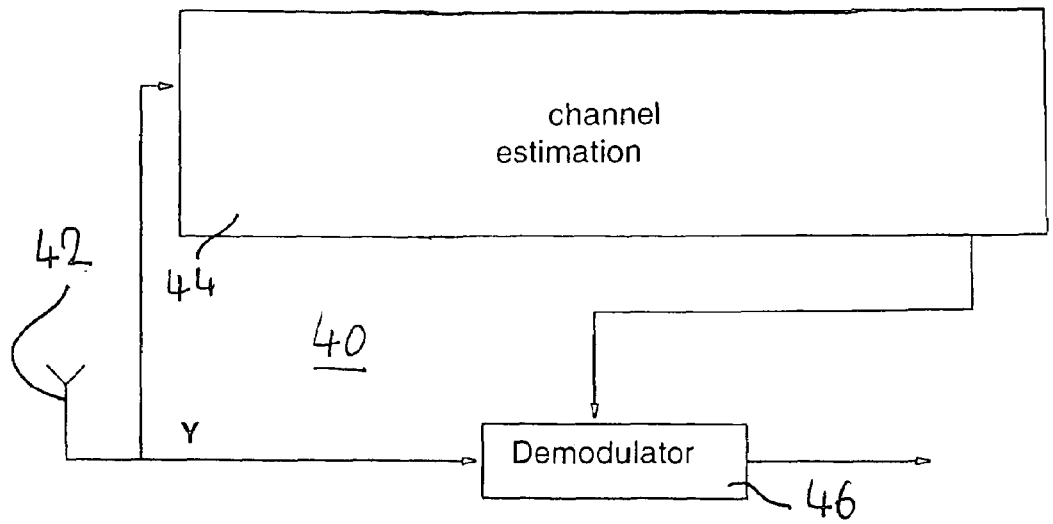
FIG. 9 is a block diagram of a receiver stage of a transceiver for wireless communication.

FIG. 9 shows some components of such a receiver stage 40 of the transceiver with the transmitter stage 10 depicted in FIG. 3. As becomes apparent from FIG. 9, a receive signal X vector Y received via a receive antenna 42 is concurrently fed to a channel estimation circuit 44 and a demodulator 46. In the following, operation of the channel estimating circuit 44 is exemplarily described for the case that two transmit antennas and one receive antenna 42 are utilized (FIG. 6).

In this case encoding of the data signal can be performed on the basis of the above block code matrix (6) and the receive signal vector can be written as $Y=[Y_j Y_{j+1}]^T$. The index j denotes a specific instant in time or frequency depending on whether STBC or SFBC is utilized.

At a first instant j, $X_i$ is transmitted from the first transmit antenna and $X_{i+1}$ is transmitted from the second transmit antenna. At a subsequent instant j+1, $-X^*_{i+1}$ is transmitted from the first transmit antenna and $X^*_i$ is transmitted from the second transmit antenna. The individual components $Y_j$ and $Y_{j+1}$ of the receive signal vector Y can thus be written as $$Y_j = X_i \cdot h^{(1)}(z_j) + X_{i+1} \cdot h^{(2)}(z_j) + n_j$$

$$Y_{j+1} = -X^*_{i+1} \cdot h^{(1)}(z_{j+1}) + X^*_i \cdot h^{(2)}(z_{j+1}) + n_{j+1} \quad (9)$$

The instant variable $z_j$ denotes either the time index $t_j$ if STBC is applied or the frequency index $f_j$ if SFBC is applied. Therefore, $h^{(i)}(z_j)$ is the coefficient of the channel between the transmit antenna i and the receive antenna for a data symbol transmitted at $t_j$ (STBC) or via the frequency $f_j$ (SFBC). The term $n_j$ denotes the white gaussian noise at the instant $z_j$.

For the case that STBC is applied ($z_j=t_j$) and the coherence time $t_c$ is relatively large, i.e. if relation (4) is fulfilled, or for the case that SFBC is applied ($z_j=f_j$) and the coherence bandwidth $B_C$ is relatively large, i.e. if relation (3) is fulfilled, the following assumptions are valid $$h^{(1)}(z_j) = h^{(1)}(z_{j+1}) = h^{(1)}$$

$$h^{(2)}(z_j) = h^{(2)}(z_{j+1}) = h^{(2)} \quad (10)$$

This means that if either the coherence time $t_C$ or the coherence bandwidth $B_C$ is relatively large, and if additionally the appropriate block-coding scheme was chosen, equations (9) become $$Y_j = X_i \cdot h^{(1)} + X_{i+1} \cdot h^{(2)} + n_j$$

$$Y_{j+1} = -X^*_{i+1} \cdot h^{(1)} + X^*_i \cdot h^{(2)} + n_{j+1} \quad (11)$$

Equation (11) can be written in terms of the receive signal vector Y and a data matrix Z, which is equivalent to the code matrix C, as $$Y = \begin{bmatrix} Y_j \\ Y_{j+1} \end{bmatrix} = \begin{bmatrix} X_i & X_{i+1} \\ -X^*_{i+1} & X^*_i \end{bmatrix} \cdot \begin{bmatrix} h^{(1)} \\ h^{(2)} \end{bmatrix} + \begin{bmatrix} n_j \\ n_{j+1} \end{bmatrix} = Z \cdot H + N \quad (12)$$

In order to provide an estimate for the channel coefficients $h^{(1)}$ and $h^{(2)}$, the receive signal vector Y is multiplied with the Hermitian $Z^H$ of the known data matrix Z. The content of the known data matrix Z corresponds to a standardized preamble portion which is known to the transceiver. The multiplication of $Z^H$ and Y yields $$Z^H \cdot Y = Z^H Z \cdot H + Z^H \cdot N = \hat{H} \quad (13)$$

Since Z is a scaled unitary matrix, i.e.

$$Z^{-1} = \frac{1}{det(X)} Z^H \quad (14)$$

the channel coefficients in equation (13) are separated.

The estimated channel coefficients thus obtained were derived based on the assumption that the individual channels do not change during an amount of instants $z_j$ required to transmit one data word. However, in many cases equations (11) are not valid. When applying STBC, this means that the channel changes during the amount of instants required to transmit one space-time data word, i.e. during N adjacent data symbols, because the coherence time $t_C$ is comparatively small. In the case of two transmit antennas this means that $h^{(i)}(t) \neq h^{(i)}(t+T)$, where i=1,2 and where T denotes the duration of a data symbol. When applying SFBC, the problem arises that the channel changes over N adjacent subcarriers, which are required to transmit one space-frequency code word, because the coherence bandwidth $B_C$ is comparatively small. In other words, $h^{(i)}(f) \neq h^{(i)}(f+\Delta f)$, where i=1,2 and where $\Delta f=1/T$ denotes the subcarrier spacing. As a consequence of a fact that equations (3) and (4), and thus equations (10), are generally not valid, equation (13) will even in a noiseless case not yield the exact channel coefficients.

Figure 10:
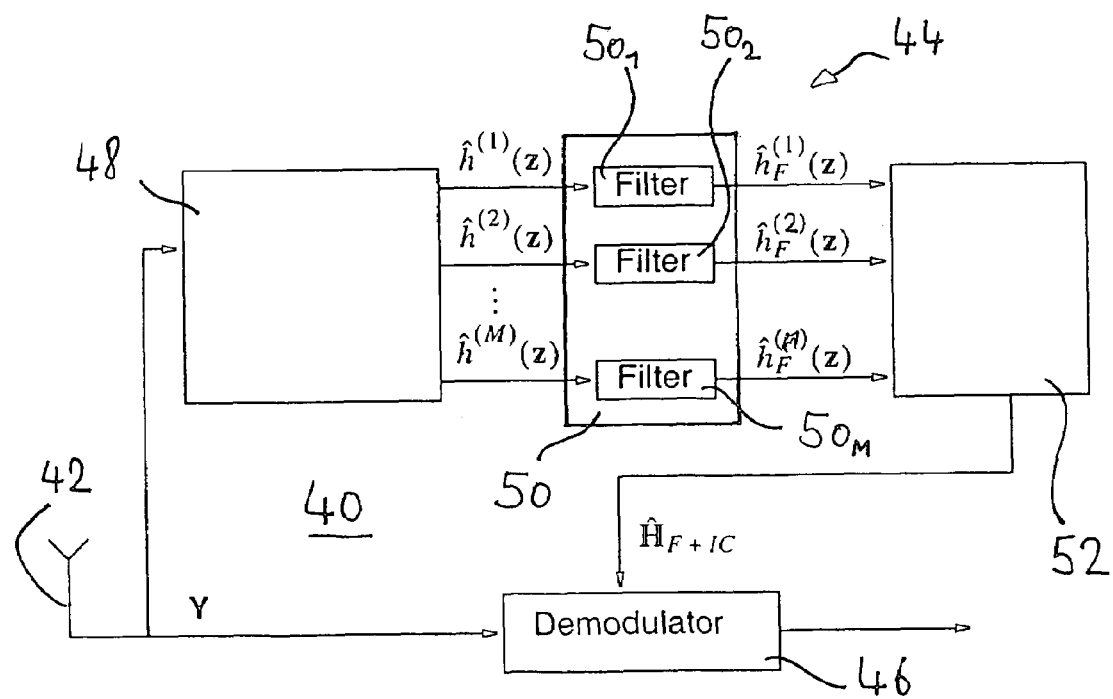
FIG. 10 shows a more detailed block diagram of the receiver stage of FIG. 9.

In order to improve the estimates for the channel coefficients, the estimating circuit 44 of the receiver stage 40 depicted in FIG. 9 is constructed as depicted in FIG. 10. As becomes apparent from FIG. 10, the estimating circuit 44 according to the invention comprises a unit 48 for determining from a receive signal vector Y estimated channel coefficients for each of the channels, the estimated channel coefficients comprising artificially introduced interference components from adjacent channels, a processing unit 50 for exploiting a correlation among the estimated channel coefficients in order to obtain processed channel coefficients, and a unit 52 for deriving estimates for the interference components and for determining interference-compensated estimates for the channel coefficients using the estimates for the interference components.

In the following, the operation of the channel estimating circuit 44 depicted in FIG. 9 will be described in more detail.

In a first step, the unit 48 for determining the estimated channel coefficients receives the receive signal vector Y. Within the unit 48, the receive signal vector Y is multiplied with the Hermitian $Z^H$ of the known data matrix Z corresponding to the standardized data symbols comprised within a preamble portion of the transmitted OFDM data signal. One thus obtains $$Z^H \cdot Y = \hat{H} \quad (15)$$

Since $Z^H$ can be written as $$Z^H = \begin{bmatrix} X^*_i & -X_{i+1} \\ X^*_{i+1} & X_i \end{bmatrix} \quad (16)$$

and since $\hat{H}$ can be written as $\hat{H}=[\hat{h}^{(1)}(z)\hat{h}^{(2)}(z)]^T$, equation (15) can be written as $$\hat{h}^{(1)}(z_j)=\hat{h}^{(1)}(z_{j+1})=X^*_i\cdot Y_j-X_{i+1}\cdot Y_{j+1}$$

$$\hat{h}^{(2)}(z_j)=\hat{h}^{(2)}(z_{j+1})=X^*_{i+1}\cdot Y_j+X_i\cdot Y_{j+1} \quad (17)$$

The above equation (17) departs from the assumption that $$h^{(i)}(z_j)=h^{(i)}(z_{j+1})=h^{(i)}(z) \quad (18)$$

This assumption corresponds to equation (10) and was made because it is impossible to obtain the four unknown parameters $h^{(1)}(z_j)$, $h^{(1)}(z_{j+1})$, $h^{(2)}(z_j)$ and $h^{(2)}(z_{j+1})$ from the two only equations (9). In other words, equations (9) are under-determined.

Now the values of $Y_j$ ad $Y_{j+1}$ of equations (9) are inserted into equations (17) and one obtains:

$$\hat{h}^{(1)}(z)=|X_i|^2\cdot h^{(1)}(z_j)+|X_{i+1}|^2\cdot h^{(1)}(z_{j+1})+X^*_i\cdot X_{i+1}\cdot\{h^{(2)}(z_j)-h^{(2)}(z_{j+1})\}+X^*_i\cdot n_j-X_{i+1}\cdot n_{j+1}$$

$$\hat{h}^{(2)}(z)=|X_{i+1}|^2\cdot h^{(2)}(z_j)+|X_i|^2\cdot h^{(2)}(z_{j+1})+X_i\cdot X_{i+1}\cdot\{h^{(1)}(z_j)-h^{(1)}(z_{j+1})\}+X^*_{i+1}\cdot n_j+X_i\cdot n_{j+1} \quad (19)$$

As becomes apparent from the above equation (19), the estimated channel coefficients $\hat{h}^{(1)}(z)$ and $\hat{h}^{(2)}(z)$ comprise three different components, namely a useful component $U^{(i)}$, an interference component $I^{(i)}$ and a noise component $N^{(i)}$. Equations (19) can therefore also be written as $$\hat{h}^{(1)}(z) = U^{(1)}(h^{(1)}(z_j), h^{(1)}(z_{j+1})) + \quad (20)$$
$$I^{(1)}(h^{(2)}(z_j), h^{(2)}(z_{j+1})) + N^{(1)}$$
$$= U^{(1)} + I^{(1)} + N^{(1)}$$

$$\hat{h}^{(2)}(z) = U^{(2)}(h^{(2)}(z_j), h^{(2)}(z_{j+1})) + \quad (21)$$
$$I^{(2)}(h^{(1)}(z_j), h^{(1)}(z_{j+1})) + N^{(2)}$$
$$= U^{(2)} + I^{(2)} + N^{(2)},$$

whereby $$I^{(1)}=X^*_i\cdot X_{i+1}\cdot\{h^{(2)}(z_j)-h^{(2)}(z_{j+1})\}$$

$$I^{(2)}=X_i\cdot X^*_{i+1}\cdot\{h^{(1)}(z_j)-h^{(1)}(z_{j+1})\} \quad (22)$$

The interference components $I^{(i)}$ of the estimated channel coefficients $\hat{h}^{(i)}(z)$ are a manifestation of block-coding, of the assumptions (10) and (18) that the channels do not change during an amount of instants required to transmit one data word, and of the fact that the channels do change over N instants, i.e. the fact that assumptions (10) and (18) are not valid. The interference components are thus not present in the actual channel coefficients. Therefore, a cancellation of these interference components $I^{(i)}$ comprised within the estimated channel coefficients $\hat{h}^{(i)}$ would lead to improved estimates for the channel coefficients $h^{(i)}$.

Due to the fact that equation (9) is under-determined, it is not possible to determine the interference components $I^i$ exactly. Instead, estimates $\hat{I}^{(i)}$ have to be derived. In the following, a possible approach for deriving estimates $\hat{I}^{(i)}$ for the interference components $I^{(i)}$ is exemplarily described with reference to FIG. 11.

Figure 11:
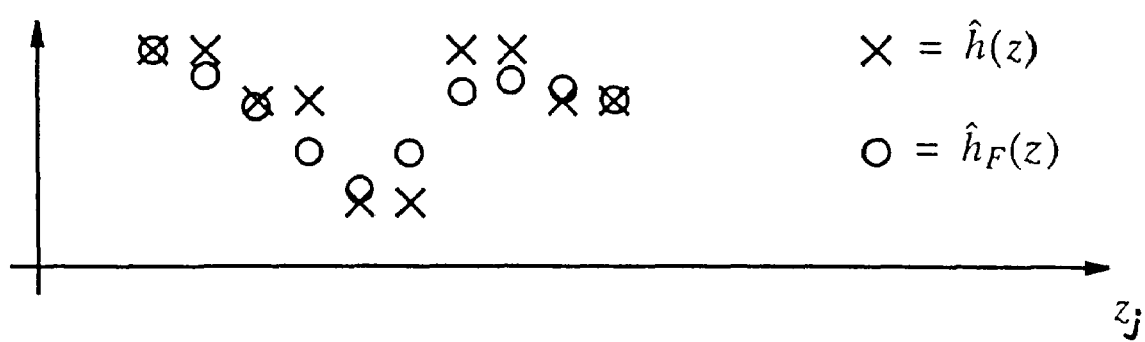
FIG. 11 is a graphical representation of the estimated channel coefficients prior to and after a correlation operation.

In FIG. 11, the crosses denote the estimated channel coefficients $\hat{h}^{(i)}$ of channel i for a series of instants $z_j$. These estimated channel coefficients $\hat{h}^{(i)}$ were determined by the unit 48 for providing estimated channel coefficients as described above. From FIG. 11 it can clearly be seen that the estimated channel coefficients $\hat{h}^{(i)}$ of two neighboring instants $z_j$ and $z_{j+1}$ are identical. This is an expression of the assumption according to equations (10) and (18). However, since two neighboring estimated channel coefficients $\hat{h}^{(i)}$ are identical, the estimated channel coefficients $\hat{h}^{(i)}$ cannot be used as a basis for actually calculating the interference components. This becomes apparent from equation (22) because if the appropriate estimated channel coefficients $h^{(i)}$ were inserted, the interference components $I^{(i)}$ would all be zero.

It is therefore necessary to break the identity of estimated channel coefficients $\hat{h}^{(i)}$ belonging to adjacent instants in order to obtain more realistic estimates for the actual channel coefficients $h^{(i)}$. One way of breaking the identity among estimated channel coefficients $\hat{h}^{(i)}$ belonging to adjacent instants are methods like filtering which exploit the correlation among the estimated channel coefficient $\hat{h}^{(i)}$. To that end, the estimation circuit 44 of the receiver stage 40 depicted in FIG. 10 comprises a processing unit 50 with a plurality of filters $50_1, 50_2 \ldots 50_M$.

For the filtering process within a specific filter $50_i$, all estimated channel coefficients $h^{(i)}(z_j)$ for the channel i are used (j=1 ... $N_X$, $N_X$ denotes the number of subcarriers in the frequency domain or the number of data symbols in the time domain to which the filtering process should be applied). If SFBC is applied for example, the filtering process may be applied to all used subcarriers.

If a low-pass filter g(z) is used for the filtering process, the filtered estimated channel coefficients $\hat{h}_F^{(i)}$ output by the processing unit 50 can be written as $$\hat{h}_F^{(i)}(z) = \hat{h}^{(i)}(z)*g(z) = \sum_{m=1}^{N_X}\hat{h}^{(i)}(m)\cdot g(z-m) \quad (23)$$

During the filtering process, different estimates for the channel coefficients $h^{(i)}(z_j)$ and $h^{(i)}(z_{j+1})$ are obtained because the filtering exploits the correlation among the individual estimated channel coefficients $\hat{h}^{(i)}$ of adjacent instants. Of course, the filtering process is only one possibility if exploiting this correlation. Other processes like linear interpolation could also be used. However, the filtering process is especially advantageous because it not only provides the required different estimates for the channel coefficients of adjacent instants, but also suppresses the noise components $N^{(i)}$ present in the estimated channel coefficients $\hat{h}^{(i)}$. As becomes apparent from equations (20) and (21), the processed (i.e. filtered) estimated channel coefficients $\hat{h}_F^{(i)}(z)$ can be written as $$\hat{h}_F^{(i)}(z)=U_F^{(i)}+I_F^{(i)}+N_F^{(i)} \quad (24)$$

with $$I_F^{(1)}=X^*_i\cdot X_{i+1}\cdot\{h_F^{(2)}(z_j)-h_F^{(2)}(z_{j+1})\}$$

$$I_F^{(2)}=X^*_i\cdot X_{i+1}\cdot\{h_F^{(1)}(z_j)-h_F^{(1)}(z_{j+1})\} \quad (25)$$

Estimates $\hat{I}_F^{(1)}$ for the interference components $I_F^{(i)}$ can be calculated on the basis of the processed channel coefficients $\hat{h}_F^{(i)}(z)$. Equations (25) then yield $$\hat{I}_F^{(1)}=X^*_i\cdot X_{i+1}\cdot\{\hat{h}_F^{(2)}(z_j)-\hat{h}_F^{(2)}(z_{j+1})\}$$

$$\hat{I}_F^{(2)}=X_i\cdot X^*_{i+1}\cdot\{\hat{h}_F^{(1)}(z_j)-\hat{h}_F^{(1)}(z_{j+1})\} \quad (26)$$

These calculations are performed within the unit 52 of the estimation circuit 44 illustrated in FIG. 10. The calculation takes into account the processed channel coefficients $\hat{h}_F^{(i)}$ received from the correlation unit 50.

The estimates $\hat{I}_F^{(i)}$ for the interference components $\hat{I}_F^{(i)}$ are used for interference cancellation. Thus, improved estimates $\hat{h}_{F+IC}^{(i)}(z)$ are determined within the unit 52 as follows $$\hat{h}_{F+IC}^{(i)}(z) = \hat{h}_F^{(i)}(z) - \hat{I}_F^{(i)} \quad (27)$$

After the improved estimates $\hat{h}_{F+IC}^{(i)}$ have been determined, they are passed from the unit 52 in the form of a matrix $\hat{H}_{F+IC}$ to the demodulator 46 of the receiver stage 40.

The basic concept underlying the invention can be extended to transmit diversity systems comprising more than two transmit antennas. The following embodiment of the invention is based on a transmit diversity system comprising three transmit antennas and operating in accordance with a block-coding scheme using the code matrix shown in equation (7). For the noiseless case, equation (11) can be written as $$Y = Z \cdot H \quad (28)$$

which is equivalent to $$Y_j = X_i \cdot h_j^{(1)} + X_{i+1} \cdot h_j^{(2)} + X_{i+2} \cdot h_j^{(3)} \quad (29)$$
$$Y_{j+1} = -X_{i+1} \cdot h_{j+1}^{(1)} + X_i \cdot h_{j+1}^{(2)} - X_{i+3} \cdot h_{j+7}^{(3)}$$
$$\ldots = \ldots$$
$$Y_{j+7} = -X_{i+3}^* \cdot h_{j+7}^{(1)} - X_{i+2}^* \cdot h_{j+7}^{(2)} + X_{i+3}^* \cdot h_{j+7}^{(3)}$$

In equation (29), the abbrevation $\hat{h}^{(i)}(z_j) = \hat{h}_j^{(i)}$ is used. Departing from the equation $$Z^H \cdot Y = Z^H \cdot Z \cdot H \quad (30)$$

the channel coefficients $h^{(1)}$ of the first transmit antenna can be derived using equation (29) follows $$\hat{h}_j^{(1)} = \hat{h}_{j+1}^{(1)} \quad (31)$$
$$= \ldots$$
$$= \hat{h}_{j+7}^{(1)}$$
$$= X_i^*(X_i \cdot h_j^{(1)} + X_{i+1} \cdot h_j^{(2)} + X_{i+2} \cdot h_j^{(3)}) -$$
$$X_{i+1}^*(-X_{i+1} \cdot h_{j+1}^{(1)} + X_i \cdot h_{j+1}^{(2)} - X_{i+3} \cdot h_{j+1}^{(3)}) +$$
$$-X_{i+3}(-X_{i+3}^* \cdot h_{j+7}^{(1)} - X_{i+2}^* \cdot h_{j+7}^{(2)} + X_{i+3}^* \cdot h_{j+7}^{(3)})$$

From equation (31) the interference components can be deduced. The interference components for the first antenna are for example $$X_i^* X_{i+1} \cdot h_j^{(2)} - X_{i+1}^* X_i \cdot h_{j+1}^{(2)}, \quad (32)$$

which is part of the interference from the second antenna, and $$X_i^* X_{i+2} \cdot h_j^{(3)} - X_{i+1}^* X_{i+3} \cdot h_{j+1}^{(3)}, \quad (33)$$

which is part of the interference from the third transmit antenna.

The individual interference components are determined by subjecting equation (31) to a filtering process as described earlier. Thereafter, interference cancellation is performed as outlined above to derive improved estimates for the channel coefficients.

The invention claimed is:

1. A method of estimating channel coefficients (h) in a multi carrier transmit diversity system operating in accordance with a block-coding scheme, comprising:
   a) determining from a receive signal for each channel estimated channel coefficients comprising artificially introduced interference components from adjacent channels;
   b) deriving estimates for the interference components; and
   c) determining interference-compensated estimates for the channel coefficients on the basis of the estimates for the interference terms.

2. The method of claim 1, wherein the estimated channel coefficients are determined based on the assumption that the channels do not change during an amount of instants required to transmit two or more data symbols.

3. The method according to claim 2, wherein, based on the assumption, the estimated channel coefficients are determined such that the estimated channel coefficients two or more adjacent instants are identical.

4. The method of claim 1, wherein determining the estimated channel coefficients comprises multiplying a known data matrix comprised within the receive signal with the Hermitian of the known data matrix.

5. The method of claim 1, wherein the step of determining estimates for the interference components of a specific channel comprises exploiting a correlation among a plurality of channel coefficients estimated for the specific channel.

6. The method according to claim 5, wherein the estimated channel coefficients are processed such that for the specific channel an identity of estimated channel coefficients which belong to adjacent instants is broken.

7. The method of claim 6, wherein processing of the estimated channel coefficients is effected by interpolation or filtering.

8. The method of claim 6, wherein the estimates for the interference components are derived from the processed channel coefficients.

9. The method of claim 6 wherein the interference-compensated estimates for the channel coefficients are derived from the processed channel coefficients.

10. The method of claim 9, wherein determining the interference-compensated estimates comprises subtracting the estimates for the interference components (I) from the processed channel coefficients.

11. The method of claim 1, wherein the block-coding is effected by space-time block-coding or space-frequency block-coding.

12. The method of claim 11, further comprising switching between space-time block-coding and space-frequency block-coding in dependence on one or more transmission constraints.

13. A computer program product comprising program code portions for performing the steps of claim 1 when the product is run on a computer.

14. The computer program product of claim 13 stored on a computer readable recording medium.

15. An estimating circuit for estimating channel coefficients in a multi carrier transmit diversity system operating in accordance with a block-coding scheme, comprising:
   a) a unit for determining from a receive signal for each channel estimated channel coefficients comprising artificially introduced interference components from adjacent channels; and b) a unit for deriving estimates for the interference components and for determining interference-compensated estimates for the channel coefficients on the basis of the estimates for the interference components.

16. The estimating circuit according to claim 15, further comprising a processing unit for processing a plurality of channel coefficients estimated for a specific channel utilizing a correlation among the estimated channel coefficients.

17. A transceiver of a wireless communication system comprising a receiver stage with an estimating circuit according to claim 15.

* * * * *

UNITED STATES PATENT AND TRADEMARK OFFICE
CERTIFICATE OF CORRECTION

| | | |
|---|---|---|
| PATENT NO. | : 7,181,177 B2 | Page 1 of 1 |
| APPLICATION NO. | : 10/766023 | |
| DATED | : February 20, 2007 | |
| INVENTOR(S) | : Pauli et al. | |

It is certified that error appears in the above-identified patent and that said Letters Patent is hereby corrected as shown below:

On the Title Page, Item -75-, under "Inventors", Line 1, delete "Nümberg" and insert -- Nurnberg --, therefor.

In Fig. 10, Sheet 5 of 6, above Tag "$50_M$" delete " $\hat{h}_F^{(M)}(z)$ " and insert -- $\hat{h}_F^{(M)}(z)$ --, therefor.

In Column 11, Line 10, delete "X" before "vector Y".

In Column 11, Line 23, delete "$X^*_I$" and insert -- $X^*_i$ --, therefor.

In Column 14, Line 57, after "Estimates" delete "$\hat{I}_F^{(1)}$" and insert -- $\hat{I}_F^{(i)}$ --, therefor.

In Column 15, Line 31, delete "abbrevation" and insert -- abbreviation --, therefor.

In Column 16, Line 21, in Claim 3, after "coefficients" insert -- of --.

In Column 16, Line 41, in Claim 9, after "claim 6" insert -- , --.

Signed and Sealed this

Fifteenth Day of July, 2008

JON W. DUDAS
*Director of the United States Patent and Trademark Office*